United States Patent
Doering et al.

(10) Patent No.: US 7,068,143 B2
(45) Date of Patent: Jun. 27, 2006

(54) METHOD AND APPARATUS FOR THE REMOTE CONTROL OF AN OPERATING TABLE

(75) Inventors: Ulrich Doering, Saalfeld (DE); Christian Streitberger, Saalfeld (DE); Falk Georgi, Unterwirbach (DE)

(73) Assignee: TRUMPF Medizin Systeme GmbH, Saalfeld (DE)

( * ) Notice: Subject to any disclaimer, the term of this patent is extended or adjusted under 35 U.S.C. 154(b) by 584 days.

(21) Appl. No.: 10/293,234

(22) Filed: Nov. 13, 2002

(65) Prior Publication Data

US 2003/0139177 A1    Jul. 24, 2003

(30) Foreign Application Priority Data

Nov. 20, 2001    (EP)    ................................... 01127644

(51) Int. Cl.
*G05B 23/02*    (2006.01)
(52) U.S. Cl. .................... 340/3.1; 340/3.71; 700/83
(58) Field of Classification Search ................ 340/3.1, 340/3.2, 3.71, 825.69, 825.72, 825.49; 700/83, 700/17; 5/616, 600; 341/176, 175; 455/45
See application file for complete search history.

(56) References Cited

U.S. PATENT DOCUMENTS

| 4,211,998 A |   | 7/1980 | Junginger et al. |
|---|---|---|---|
| 6,351,678 B1 | * | 2/2002 | Borders .................... 700/83 |
| 6,424,285 B1 | * | 7/2002 | Perdue et al. ............. 341/176 |
| 6,753,790 B1 | * | 6/2004 | Davies et al. .......... 340/825.69 |
| 6,915,109 B1 | * | 7/2005 | Wouters et al. ............ 455/45 |

FOREIGN PATENT DOCUMENTS

| DE | 27 38 406 | 3/1979 |
|---|---|---|
| DE | 197 51 320 | 5/1999 |
| DE | 199 29 907 | 12/2000 |

* cited by examiner

*Primary Examiner*—Michael Horabik
*Assistant Examiner*—William Bangachon
(74) *Attorney, Agent, or Firm*—Lipsitz & McAllister, LLC

(57) ABSTRACT

Remote control of an operating table which can be motor-adjusted by means of a drive device is provided for. Command signals for controlling the drive device are wirelessly transmitted to the operating table from an operator control unit. A unique association between the operator control unit and an operating table is ensured before command signals are sent by emitting an infrared control signal to the operating table by the operator control unit and then confirming the reception of the control signal from the operator control unit by radio signal from the operating table.

11 Claims, 1 Drawing Sheet

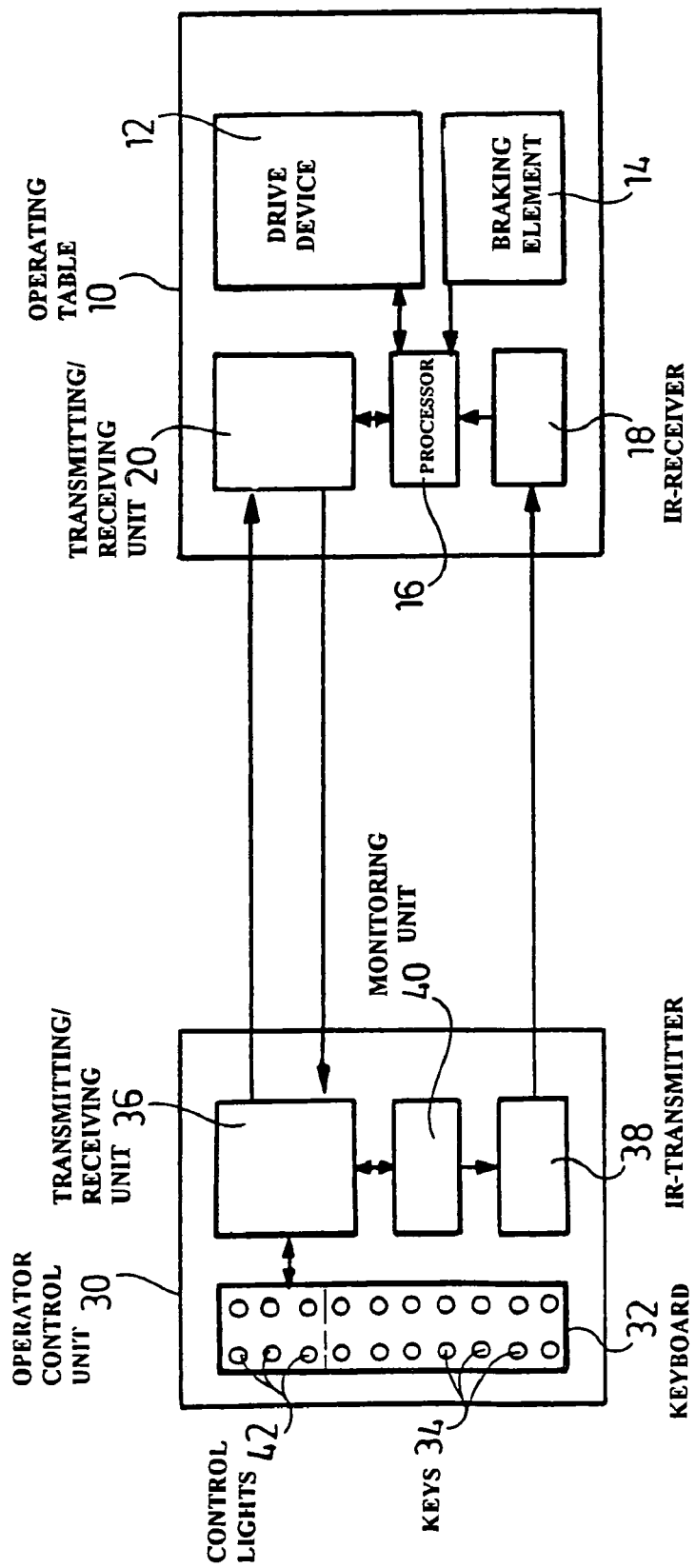

METHOD AND APPARATUS FOR THE REMOTE CONTROL OF AN OPERATING TABLE

The present disclosure relates to the subject matter disclosed in European application No. 01127644.1 of Nov. 20, 2001, which is incorporated herein by reference in its entirety and for all purposes.

BACKGROUND OF THE INVENTION

The invention relates to a method for the remote control of an operating table which can be motor-adjusted by means of a drive device, command signals for controlling the drive device being wirelessly transmitted to the operating table from an operator control unit.

The invention also relates to an apparatus for carrying out the method.

Operating tables are increasingly being made in a multi-part form and often comprise a height-adjustable supporting column and an operating table top with at least one pivotably mounted table top element. The operating table usually also has an electromotive drive device for adjusting the at least one table top element and the supporting column. The control of the drive device takes place by the input of appropriate command signals. Usually used for this purpose is an operator control unit, which is either connected to the operating table via a connection cable or is in connection with the operating table via an infrared or radio link.

The transmission of the command signals by means of an infrared link has the advantage that no electromagnetic interference radiation is generated and that it can be achieved by constructionally simple means. However, infrared transmission permits only very limited data transmission rates and optically opaque obstacles prevent data transmission.

If a radio link is used for the transmission of the command signals from the operator control unit to the operating table, this has the advantage that high data transmission rates and a very stable connection can be achieved. A radio link between the operator control unit and the operating table is also distinguished by a long range.

If the communication between the operator control unit and the operating table takes place by radio, there is however the associated difficulty that the connection of the items of equipment is maintained even when the operating table is moved out of the room in which it was previously operated by means of the operator control unit. There is consequently the risk that the operator control unit in the form of a separate unit may inadvertently activate the wrong operating table, for example a table which is not positioned in the operating room but in a neighboring room.

It is an object of the present invention to develop a method and an apparatus for the remote control of an operating table of the type stated at the beginning in such a way that a unique association between the operator control unit and an operating table is ensured in a constructionally simple way.

SUMMARY OF THE INVENTION

This object is achieved according to the invention in the case of a method of the type stated at the beginning by an infrared control signal first being emitted to the operating table by the operator control unit before the transmission of command signals and the reception of the control signal from the operator control unit being confirmed by radio signal. The transmission of the infrared control signal from the operator control unit to the operating table ensures that there is a visual link between the operator control unit and the operating table to be operated. As a result, a unique association between the items of equipment is ensured in a constructionally simple way. Only the operating table which is located in the room in which the operator control unit—for example in the form of a wall-mounted console—is positioned can be operated. Inadvertent adjustment of an operating table which is located in a neighboring room is avoided in this way. The transmission of the confirmation signal takes place in this case in the form of a radio signal, with the advantages of a high data transmission rate and a stable connection.

It is advantageous if the drive device can only be activated after the operator control unit has received the radio signal from the operating table confirming reception. Consequently, the activation of the drive device can only take place when the operating table emits a confirmation signal and this has been received by the operator control unit.

It is of particular advantage if the command signals are transmitted between the operator control unit and the operating table in the form of radio signals. In this case, a bidirectional radio link can be used, so that high data transmission rates can be achieved in both directions and a stable connection can be maintained.

It may also be provided that the command signals are transmitted from the operator control unit to the operating table in the form of infrared signals. This ensures that there is a visual link between the operator control unit and the operating table when command signals are transmitted. In a way corresponding to the emission of the confirmation signals, checkback signals, which are output by the operating table as a response to the reception of command signals, may also be transmitted as radio signals.

In the case of an advantageous embodiment of the method according to the invention, it is provided that infrared control signals are repeatedly emitted by the operator control unit at predetermined intervals—preferably periodically—and in each case the reception of a confirmation signal from the operating table is monitored. This permits virtually continuous monitoring of the association between the operator control unit and the operating table. The repeated emission of infrared control signals also has the advantage that an operating table which is brought into the room in which the operator control unit is located is automatically detected by the operator control unit, so that an association between the operator control unit and this operating table is established.

The operating tables can usually be fixed in place. In connection with operating tables of this type, it is provided in the case of an advantageous embodiment of the method according to the invention that the drive device of the operating table can be activated only while the operating table is fixed in place, as long as no further infrared control signals are transmitted. As a result, it is possible to dispense with a periodic infrared interrogation by the operator control unit; all that is required instead is for an infrared control signal to be received and confirmed by the operating table on one occasion, provided that the operating table has been fixed in place. As long as it remains fixed in place, the unique association between the operator control unit and the operating table remains, on account of the absence of mobility. If the fixing is released, the drive device for adjusting the operating table is blocked, unless an infrared control signal is subsequently received again from the operator control unit and consequently a visual link exists between the two items of equipment.

As mentioned at the beginning, the invention also relates to an apparatus for the remote control of an operating table. The apparatus comprises an operator control unit and an operating table, the operating table being motor-adjustable by means of a drive device and command signals for optionally activating the drive device being wirelessly transmittable to the operating table from the operator control unit.

In the case of an apparatus of this type, the object stated at the beginning is achieved by the operator control unit having an infrared transmitter for emitting an infrared control signal and a radio receiver for receiving a radio signal, and by the operating table having an infrared receiver for receiving the infrared control signal and a radio transmitter for emitting a confirmation signal confirming the reception of the control signal. As already explained above, a unique association between the operator control unit and a specific operating table is ensured in a constructionally simple way by the transmission of the infrared control signal, which is conditional on a visual link between the items of equipment. The transmission of the confirmation signal takes place by radio, however, and is consequently very insensitive to interferences.

It is of advantage if the drive device can only be activated when the operator control unit has received the confirmation signal.

The command signals can preferably be transmitted in the form of radio signals. In this case, a bidirectional link can be provided between the operator control unit and the operating table, so that high data transmission rates can be used for the transmission of the command signals and, if appropriate, for the transmission of checkback signals.

Alternatively, it may be provided that the command signals can be transmitted from the operator control unit to the operating table in the form of infrared signals.

It is advantageous if infrared control signals can be repeatedly emitted by the operator control unit at predetermined intervals—preferably periodically—and in each case the reception of a confirmation signal can be monitored. For this purpose, the operator control unit may comprise a monitoring unit, which ensures that command signals can only be emitted if a confirmation signal from the operating table has previously been received.

The operating table preferably comprises a fixing element for fixing the operating table in place and the drive device can be activated only in the fixed state of the operating table, as long as no further infrared control signals are transmitted. As already explained, this makes it possible to dispense with a periodic infrared interrogation, as long as the operating table is fixed in the room.

The fixing element may, for example, comprise a brake, it only being possible for the drive device to be activated in the absence of infrared control signals with the brake applied. If command signals are emitted by the operator control unit while the fixing element, for example the brake, is released, these command signals are ignored by the operating table, unless the operating table also receives infrared control signals at predetermined intervals and consequently a visual link exists between the items of equipment. In this respect it is advantageous if the operating table has a signal processing unit which is in electrical connection not only with the infrared receiver but also with the drive device and the fixing element of the operating table, and in the absence of periodic infrared control signals passes on the incoming command signals to the drive device only when the fixing element is in a state in which it fixes the operating table in place. For example, it may be provided that the operating table is of a mobile type of construction and, for fixing, has a lowerable foot. The latter forms a fixing element for fixing the operating table in place in such a way that a signal indicating the fixed state of the operating table is produced by the lowerable foot. This signal can be input via an electrical connection of the signal processing unit of the operating table, so that this unit passes on incoming command signals to the drive device as long as the foot is in its lowered state and at least one infrared control signal has been received. If the foot is raised, so that the operating table can be moved about in the room, the signal indicating the fixed state of the operating table does not occur and command signals are passed on by the signal processing unit to the drive device only when infrared control signals from the operator control unit are once again received at predetermined intervals.

The description which follows of a preferred embodiment of the invention serves in conjunction with the drawing to explain it in more detail.

BRIEF DESCRIPTION OF THE DRAWING

The single FIGURE of the drawing shows, in the form of a block diagram, an apparatus according to the invention for the remote control of an operating table.

DETAILED DESCRIPTION OF THE INVENTION

The operating table is designated by the reference numeral 10 and comprises, in a way which is known and therefore not represented in the drawing, a height-adjustable supporting column, on which a table top with a plurality of pivotably mounted table top elements is supported. The table top may comprise, for example, a base element, which can be releasably connected to the supporting column, and also a back element and a foot element, which are respectively hinge-mounted on the base element and can be pivoted in relation to the latter about horizontal axes. In addition, the base element can be displaced in the longitudinal direction of the operating table in relation to the supporting column. Operating tables of this type are known per se and described for example in DE 197 51 320 A1.

The operating table top 10 comprises a drive device 12 in the form of an electric drive known per se, which may, for example, be integrated into the operating table top or into the supporting column.

For fixing the operating table 10 in place, a manually actuatable braking element 14 is used, which in the same way as the drive device 12 is in connection with a signal processing unit 16 of the operating table via electrical connections. Connected to the signal processing unit 16 are an infrared receiver 18 and a transmitting and receiving unit 20 for emitting and receiving radio signals.

For the motor-adjustment of the operating table 10 by means of the drive device 12, an operator control unit 30 is used, which can be fixed in place, for example as a wall-mounted console, in an operating room. The operator control unit 30 comprises an input element in the form of an input keyboard 32 with a plurality of input keys 34 for the input of control commands. The latter are transmitted in the form of command signals by radio to the transmitting and receiving unit 20 of the operating table 10. For this purpose, the operator control unit 30 has a corresponding transmitting and receiving unit 36. Consequently, a bidirectional radio link can be established between the transmitting and receiving units 36 and 20 of the operator control unit 30 and of the operating table 10.

However, the transmission of command signals from the operator control unit 30 to the operating table 10 can only take place after an infrared signal has previously being emitted by means of an infrared transmitter 38 of the operator control unit 30, this signal has been received by the infrared receiver 18 of the operating table 10 and the operating table 10 has then transmitted a radio signal by means of the transmitting and receiving unit 20 to the transmitting and receiving unit 36 of the operator control unit 30. The arrival of a confirmation signal confirming the reception of the infrared control signal is monitored by a monitoring unit 40 of the operator control unit 30.

In addition to the confirmation signals explained above, status signals indicating the respective operating state of the operating table 10 at a particular time can also be transmitted by the transmitting and receiving unit 20 of the operating table 10 and passed on by the transmitting and receiving unit 36 of the operator control unit 30 to control lights 42, so that the operating state of the operating table 10 can be identified on the basis of the control lights 42 of the operator control unit 30.

The operating table 10 is operated by means of the operator control unit 30 in such a way that, in a first method step, an infrared control signal is first emitted by the infrared transmitter 38. If there is a visual link between the operator control unit 30 and the operating table 10, the infrared control signal is received by the infrared receiver 18 and passed on to the signal processing unit 16. The reception of the infrared signal from the operator control unit 30 is confirmed by radio by means of the transmitting and receiving unit 20. The radio signal is received by the transmitting and receiving unit 36 and passed on to the monitoring unit 40. Only after arrival of the confirmation signal are command signals which have been input by an operator by means of the input keyboard 32 transmitted to the operating table 10 via the bidirectional radio link. The radio transmission may take place, for example, by the DECT procedure.

During the further operation of the operating table 10, infrared control signals are periodically emitted by the operator control unit 30, the reception of which is confirmed by the operating table 10 by radio. If the visual link between the items of equipment required for the transmission of the infrared control signals is interrupted, command signals arriving at the transmitting and receiving unit 20 are only processed when the operating table is fixed in place in the room. For this purpose, with the braking element 14 applied, a signal indicating the fixed state of the operating table 10 is produced for the signal processing unit 16. After reception of an infrared control signal on one occasion and subsequent absence of further infrared control signals, command signals arriving at the transmitting and receiving unit 20 are only passed on by the signal processing unit 16 to the drive device 12 when the signal processing unit 16 is in receipt of the signal indicating the fixed state of the operating table 10. If such a signal has not been obtained, the drive device 12 can only be activated when an infrared control signal from the operator control unit 30 has once again been received by the infrared receiver 18.

The invention claimed is:

1. A method for the remote control of an operating table which can be motor-adjusted by means of a drive device, comprising:

emitting an infrared control signal to the operating table from an operating control unit, confirming reception of the control signal by transmitting a radio signal from the operating table to the operating control unit, thereby establishing an association between the control unit and the operating table, and wirelessly transmitting command signals for controlling the drive device to the operating table from the operator control unit after the association between the control unit and the operating table is established, wherein the drive device is actuable after the association between the control unit and the operating table is established.

2. The method of claim 1, wherein the command signal are transmitted in the form of radio signals.

3. The method of claim 1, wherein the command signals are transmitted in the form of infrared signals.

4. The method of claim 1, wherein infrared signals are repeatedly emitted by the operator control unit at predetermined intervals and in each case the reception of a confirmation signal is monitored.

5. The method of claim 1, wherein the operating table can be fixed in place and the drive device can be activated only while the operating table is fixed in place, as long as no further infrared control signals are transmitted.

6. An apparatus for the remote control of an operating table which is motor-adjusted by means of a drive device, said apparatus comprising:

an operator control unit, command signals for optionally activating the drive device being wirelessly transmittable to the operating table from the operator control unit, the operator control unit having an infrared transmitter for emitting an infrared control signal and a radio receiver for receiving a radio signal, and said operating table having an infrared receiver for receiving the infrared control signal and a radio transmitter for emitting a confirmation signal confirming the reception of the control signal, wherein:

receipt of the confirmation signal establishes an association between the control unit and the operating table;

the command signals are sent after the association is established; and the drive device is actuable after the association is established.

7. The apparatus of claim 6, wherein the command signals can be transmitted in the form of radio signals.

8. The apparatus of claim 6, wherein the command signals can be transmitted in the form of infrared signals.

9. The apparatus of claim 6, wherein infrared control signals can be repeatedly emitted by the operator control unit at predetermined intervals and in each case the reception of a confirmation signal can be monitored.

10. The apparatus of claim 6, wherein:

the operating table has a fixing element for fixing the operating table in place, and the drive device can be activated only in a fixed state of the operating table, as long as no further infrared control signals are transmitted.

11. The apparatus of claim 8, wherein:

the fixing element comprises a brake, and it is only possible for the drive device to be activated in the absence of infrared control signals with the brake applied.

* * * * *

UNITED STATES PATENT AND TRADEMARK OFFICE
CERTIFICATE OF CORRECTION

| | | |
|---|---|---|
| PATENT NO. | : 7,068,143 B2 | Page 1 of 1 |
| APPLICATION NO. | : 10/293234 | |
| DATED | : June 27, 2006 | |
| INVENTOR(S) | : Doering et al. | |

It is certified that error appears in the above-identified patent and that said Letters Patent is hereby corrected as shown below:

Column 6, line 12

The word "signal" at the end of the line should read --signals--.

Signed and Sealed this

Seventh Day of November, 2006

JON W. DUDAS
*Director of the United States Patent and Trademark Office*